(12) United States Patent
Nevitt et al.

(10) Patent No.: US 11,009,638 B2
(45) Date of Patent: May 18, 2021

(54) POLYMERIC MULTILAYER OPTICAL FILM

(71) Applicant: 3M INNOVATIVE PROPERTIES COMPANY, St. Paul, MN (US)

(72) Inventors: Timothy J. Nevitt, Red Wing, MN (US); Ryan T. Fabick, Shoreview, MN (US); Laurence R. Gilbert, Marine on St. Croix, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/544,147

(22) Filed: Aug. 19, 2019

(65) Prior Publication Data

US 2020/0003941 A1    Jan. 2, 2020

Related U.S. Application Data

(63) Continuation of application No. 15/026,135, filed as application No. PCT/US2014/058010 on Sep. 29, 2014, now Pat. No. 10,429,558.

(Continued)

(51) Int. Cl.
*G02B 5/28* (2006.01)
*G02B 5/08* (2006.01)
*G02B 5/30* (2006.01)

(52) U.S. Cl.
CPC ........... *G02B 5/287* (2013.01); *G02B 5/0841* (2013.01); *G02B 5/305* (2013.01)

(58) Field of Classification Search
CPC ........ G02B 26/001; G02B 5/26; G02B 5/285; G02B 5/0816; G02B 5/286; G02B 5/0825; G02B 5/0841; G02B 1/10; G02B 5/0858; G02B 5/28; G02B 5/288; G02B 1/04; G02B 5/284; G02B 5/287; G02B 5/201; G02B 5/0833; G02B 5/22; G02B 5/282; G02B 1/005; G02B 5/003; B32B 2307/416; B32B 2551/00; B32B 17/10; B32B 27/36;
(Continued)

(56) References Cited

U.S. PATENT DOCUMENTS 3,610,729 A   10/1971 Rogers
4,446,305 A    5/1984 Rogers
(Continued)

FOREIGN PATENT DOCUMENTS

JP    2009-078535    4/2009
WO   WO 1995-17303   6/1995
WO   WO 1999-39224   8/1999

OTHER PUBLICATIONS

Macleod, Thin-Film Optical Filters, 73-136 (1986).
(Continued)

*Primary Examiner* — William R Alexander
*Assistant Examiner* — Sharrief I Broome
(74) *Attorney, Agent, or Firm* — Robert S. Moshrefzadeh

(57) ABSTRACT

Polymeric multilayer optical films are described. More particularly, polymeric multilayer optical films having a first optical packet and a second optical packet are described. The second optical packet is disposed on the first optical packet. How the configuration of the layers of the optical packets affect hemispheric reflectivity of the overall film is also described. The polymeric multilayer optical film reflects more than 95% of light from 400 nm to 700 nm at normal incidence.

6 Claims, 10 Drawing Sheets

Related U.S. Application Data

(60) Provisional application No. 61/884,596, filed on Sep. 30, 2013.

(58) Field of Classification Search
CPC .......... B32B 2250/42; B32B 2264/102; B32B 2307/418; B32B 2367/00; B32B 27/08; B32B 27/306; B32B 7/02; B32B 15/08; B32B 17/10036; B32B 17/10174; B32B 17/10761; B32B 2250/05; B32B 2250/244; B32B 2255/10; B32B 2264/0257; B32B 2264/104; C03C 17/3639; C03C 17/3417; C03C 17/3626; C03C 17/3649; C03C 17/366; C03C 17/3663; C03C 2217/734; C03C 17/3423; C03C 17/3435; C03C 17/36; C03C 17/361; C03C 17/3618; C03C 17/3636; C03C 17/3644; C03C 17/3652; C03C 17/3657; C03C 17/3665; C03C 17/3681; C03C 2201/42; C03C 2217/42; H01L 2224/48091; H01L 2924/181; H01L 2924/00012; H01L 2924/00014; H01L 33/10; H01L 33/46; H01L 51/5265; H01L 21/02002; H01L 21/02005; H01L 21/0237; H01L 21/02458; H01L 21/02513; H01L 21/0254; H01L 21/0262; H01L 21/02631; H01L 21/02658; H01L 21/306; H01L 21/30612; H01L 21/30625; H01L 21/30635

See application file for complete search history.

(56) References Cited

U.S. PATENT DOCUMENTS

| | | |
|---|---|---|
| 4,540,623 A | 9/1985 | Im |
| 5,103,337 A * | 4/1992 | Schrenk ................ G02B 1/04 359/359 |
| 5,360,659 A | 11/1994 | Arends |
| 5,448,404 A | 9/1995 | Schrenk |
| 5,882,774 A | 3/1999 | Jonza |
| 6,096,375 A | 8/2000 | Ouderkirk |
| 6,157,490 A | 12/2000 | Wheatley |
| 6,268,961 B1 | 7/2001 | Nevitt |
| 6,368,699 B1 | 4/2002 | Gilbert |
| 6,531,230 B1 | 3/2003 | Weber |
| 6,783,349 B2 | 8/2004 | Neavin |
| 7,104,776 B2 | 9/2006 | Merrill |
| 7,791,687 B2 | 9/2010 | Weber |
| 8,120,730 B2 | 2/2012 | Weber |
| 8,404,335 B2 | 3/2013 | Osada et al. |
| 9,823,395 B2 | 11/2017 | Weber et al. |
| 2003/0008144 A1 | 1/2003 | Whitney et al. |
| 2005/0243425 A1 | 11/2005 | Wheatley |
| 2007/0047080 A1 | 3/2007 | Stover |
| 2008/0151147 A1* | 6/2008 | Weber ............... G02F 1/133536 349/96 |
| 2011/0102891 A1* | 5/2011 | Derks ................ G02B 5/3041 359/485.02 |
| 2012/0097427 A1* | 4/2012 | Osada ................ B29C 55/023 174/250 |
| 2013/0058102 A1* | 3/2013 | Lin ..................... G02B 5/0833 362/296.04 |
| 2013/0215512 A1 | 8/2013 | Coggio |
| 2013/0250405 A1 | 9/2013 | Kivel et al. |

OTHER PUBLICATIONS

Weber, "Giant Birefringent Optics in Multilayer Polymer Mirrors", Science, Mar. 2000, vol. 287, pp. 2451-2456.

Thelan, Design of Optical Interference Filters, 1989.

International Search Report for PCT International Application No. PCT/US2014/058010, dated Dec. 2, 2014, 3pgs.

\* cited by examiner

POLYMERIC MULTILAYER OPTICAL FILM

BACKGROUND

Polymeric multilayer optical films are formed by coextruding tens to hundreds of molten polymer layers and subsequently orienting or stretching the resulting film. These microlayers have different refractive index characteristics and sufficient thinness so that light is reflected at interfaces between adjacent microlayers.

SUMMARY

In one aspect, the present disclosure relates to polymeric multilayer optical films. More particularly, the present disclosure relates to polymeric multilayer optical films having a first optical packet and a second optical packet disposed on the first optical packet. The first optical packet includes a group of optical layers that reflects blue light. The first optical packet is configured such that the group of optical layers that reflects blue light is nearer to the second optical packet than to the outer layers of the polymeric multilayer optical film. The polymeric multilayer optical film reflects more than about 95% of light from 400 nm to 700 nm at normal incidence. In some embodiments the group of layers that reflects blue light includes the thinnest layer of the first optical packet.

In another aspect, the present disclosure relates to a polymeric multilayer optical film having a first optical packet having a substantially linear layer profile with a negative slope, where a group of layers proximate an external side of the first optical packet reflects red light and a second optical packet, disposed on the first optical packet. The polymeric multilayer optical film reflects more than about 95% of light from 400 nm to 700 nm at normal incidence. In some embodiments the group of layers that reflects red light includes the thickest optical layer of the first optical packet. In some embodiments the group of layers that reflects red light are adjacent to the external side of the first optical packet.

In yet another aspect, the present disclosure relates to a polymeric multilayer optical film having a first optical packet having a first group of layers proximate a first side of the first optical packet reflecting substantially red light and a second group of layers proximate a second side of the first optical packet reflecting substantially blue light, and a second packet disposed on the first optical packet. The first optical packet is configured such that the second group of layers is disposed between the first group of layers and the second optical packet. The polymeric multilayer optical film reflects more than about 95% of light from 400 nm to 700 nm at normal incidence. In some embodiments, the first group of the first optical packet is adjacent the first side of the first optical packet. In some embodiments, the second group of the first optical packet is adjacent the second side of the first optical packet.

In another aspect, the present disclosure relates to a polymeric multilayer optical film having a first optical packet and a second optical packet disposed on the first optical packet. The thinnest optical layer of the polymeric multilayer optical film is substantially in the middle of the polymeric multilayer optical film and the polymeric multilayer optical film reflects more than about 95% of light from 400 nm to 700 nm at normal incidence. In some embodiments, the polymeric multilayer optical film is thinner than 100 μm, 85 μm, or 65 μm. In some embodiments, the polymeric multilayer optical film includes a third optical packet disposed on the second optical packet, and in some embodiments that polymeric multilayer optical film is thinner than 165 μm. In some embodiments, the polymeric multilayer optical film includes an anti-wetout layer. In some embodiments, the polymeric multilayer optical film reflects more than 99% of light from 400 nm to 700 nm at normal incidence.

DETAILED DESCRIPTION

Figure 1:
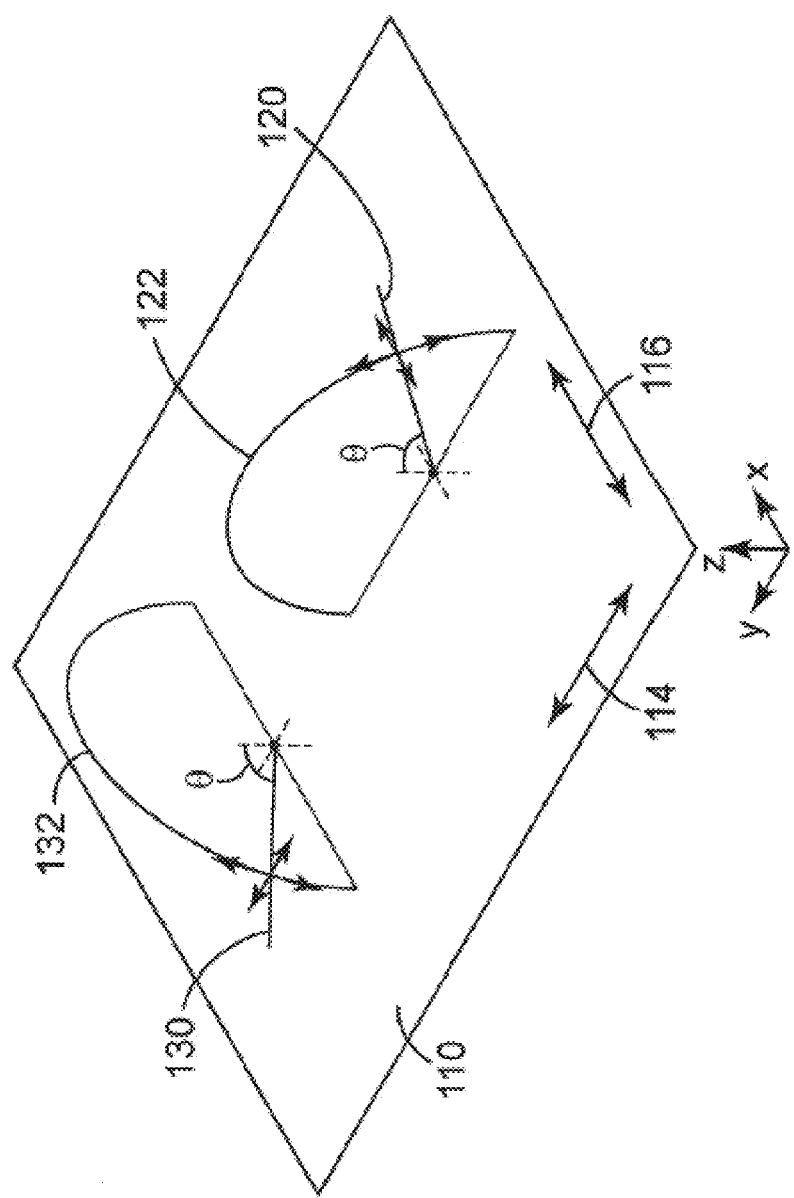
FIG. 1 is a schematic perspective view of a multilayer optical film.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters,* 2nd Ed., Macmillan Publishing Co. (1986) and by A. Thelan, *Design of Optical Interference Filters,* McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. These may be referred to as thermoplastic multilayer optical films. Such films are compatible with high volume manufacturing processes and can be made in large sheets and roll goods. The description and examples below relate to thermoplastic multilayer optical films.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Layers may be arranged generally as thinnest to thickest. In some embodiments, the arrangement of the alternating optical layers may vary substantially linearly as a function of layer count. These layer profiles may be referred to as linear layer profiles. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some cases, the protective boundary layer may be the same material as at least one of the alternating layers of the multilayer optical film. In other cases, the protective boundary layer may be a different material, selected for its physical or rheological properties. The protective boundary layers may be on one side or one both sides of an optical packet. In the case of a single-packet multilayer optical film, the protective boundary layer may be on one or both external surfaces of the multilayer optical film.

In some cases, the microlayers have thicknesses and refractive index values providing a ¼-wave stack, i.e., arranged in optical repeat units or unit cells each having two adjacent microlayers of equal optical thickness (f-ratio=50%), such optical repeat unit being effective to reflect by constructive interference light whose wavelength λ is about twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients of the optical repeat units along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

In many applications, the reflection properties of a film may be characterized in terms of "hemispheric reflectivity," $R_{hemi}(\lambda)$, meaning the total reflectivity of a component (whether a surface, film, or collection of films) when light (of a certain wavelength or wavelength range of interest) is incident on it from all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light for the wavelength range of interest yields the hemispheric reflectivity, $R_{hemi}(\lambda)$. Characterizing a reflector in terms of its $R_{hemi}(\lambda)$ may be especially convenient for backlight recycling cavities because light is often incident on the internal surfaces of the cavity—whether the front reflector, back reflector, or side reflectors—at all angles. Further, unlike the reflectivity for normal incident light, $R_{hemi}(\lambda)$ is insensitive to, and already takes into account, the variability of reflectivity with incidence angle, which may be very significant for some components within a recycling backlight (e.g., prismatic films).

It is understood that for numerous electronic display applications using backlights, and that for backlights for general and specialty lighting applications, it may be desirable for the reflector film forming the backlight's backplane to have high reflectivity characteristics. Indeed, it is further understood that the hemispheric reflectivity spectrum, $R_{hemi}(\lambda)$, strongly correlates with light output efficiency of a backlight; the higher the $R_{hemi}(\lambda)$ value across the visible light spectrum, the higher the output efficiency of the backlight. This is particularly true for recycling backlights, where other optical films may be configured over the backlight exit aperture to provide collimated or polarized light output from the backlight.

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, typically followed by passing the multilayer extrudate through one or more multiplication die, and then stretching or otherwise orienting the extrudate to form a final film. The resulting film is typically composed of many hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers typically exhibit a difference in refractive index ($\Delta n_x$) for light polarized along the x-axis of at least 0.05. In some embodiments, materials are selected such that the difference in refractive index for light polarized along the x-axis is as high as possible after orientation. If the high reflectivity is desired for two orthogonal polarizations, then the adjacent microlayers also can be made to exhibit a difference in refractive index ($\Delta n_y$) for light polarized along the y-axis of at least 0.05.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \le 0.5*\Delta n_x$, or $\Delta n_z \le 0.25*\Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z<0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In many applications, the ideal reflecting polarizer has high reflectance along one axis (the "extinction" or "block" axis) and zero reflectance along the other axis (the "transmission" or "pass" axis). For the purposes of this application, light whose polarization state is substantially aligned with the pass axis or transmission axis is referred to as pass light and light whose polarization state is substantially aligned with the block axis or extinction axis is referred to as block light. Unless otherwise indicated, pass light at 60° incidence is measured in p-polarized pass light. If some reflectivity occurs along the transmission axis, the efficiency of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices $n_{1y}$ and $n_{2y}$. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

Another design consideration discussed in '774 (Jonza et al.) relates to surface reflections at the air interfaces of the multilayer reflecting polarizer. Unless the polarizer is laminated on both sides to an existing glass component or to another existing film with clear optical adhesive, such surface reflections will reduce the transmission of light of the desired polarization in the optical system. Thus, in some cases it may be useful to add an antireflection (AR) coating to the reflecting polarizer.

Polymeric multilayer optical films as described herein may be highly reflective; for example, they may reflect more than 95% or 99% or even 99.5% of visible light, as measured at normal incidence. Visible light may be characterized as wavelengths between 400 nm and 700 nm, or in some cases between 420 nm and 700 nm. Further, polymeric multilayer optical films as described herein may be thing in some cases, thinner than 100 μm, 85 μm, or 65 μm. In embodiments where the polymeric multilayer optical film includes a third optical packet, the film may be thinner than 165 μm.

Skin layers are sometimes added which occurs after the feedblock but before the melt exits the film die. The multilayer melt is then cast through a film die onto a chill roll in the conventional manner for polyester films, upon which it is quenched. The cast web is then stretched in different ways to achieve birefringence in at least one of the optical layers, producing in many cases either a reflective polarizer or mirror film, as has been described in, for example, U.S. Patent Publication No. 2007/047080 A1, U.S. Patent Publication No. 2011/0102891 A1, and U.S. Pat. No. 7,104,776 (Merrill et al.).

Previously, it was believed that in order to maximize reflectivity, layers that are resonant at blue light—in other words, layers that are tuned to have a thickness a quarter of blue wavelengths (with an optical repeat unit of 2 microlayers having half the wavelength of blue light and therefore reflecting blue light through constructive interference)—should be near an external optical surface of the multilayer optical film. More specifically, it was believed that for a multilayer optical film configured in a backlight, the multilayer optical film should be configured such that light incident on the film is first incident on the layers that reflect blue light. In some embodiments, where an optical packet has a substantially linear layer profile, the slope of that linear profile may be characterized as positive, negative, or substantially zero. The direction of the layer numbers for the purposes of calculating slope should be from an external side to an internal side, in the case of multiple optical packets. In the case of a single optical packet, the analysis of whether a slope is positive or negative depends on its arrangement or orientation in a backlight, and in that case is from the side light is first incident on to the other side on the film.

In some embodiments, especially those that have a substantially linear layer profile, a group of adjacent layers within an optical packet will act coherently due to the optical thicknesses of the individual layers and the associated optical repeat units, substantially reflecting light in a certain wavelength range. For example, a group of adjacent layers may reflect near-infrared light, or it may reflect blue light or red light. The precise boundaries of these layer groups are not of critical importance but it is often helpful to discuss "blue layers" and "red layers" (layers that substantially reflect blue light and substantially reflect red light, respectively) and their relative configuration. A group of layers may have one or several stray layers whose optical thicknesses are tuned to reflect other wavelengths. In some embodiments, a group of layers is proximate an external side of the optical packet. A group of layers can be proximate an external side of the multilayer optical film even though a single or several layers are between the group of layers and the external side of the optical packet. External in this context means the outside of the optical layers in that film tuned to reflect desired wavelengths of light and not necessarily on an external surface or incident on air. For example, additional layers, such as skin layers, thick dimensionally stable layers, anti-wetout layers, or antireflection layers, or even additional films such as turning films or diffusers may be disposed outside an external side and their presence or absence will not affect the characterization of a group of layers as being proximate an external side of the optical packet. Similarly, an internal side of the multilayer optical film means a side of an optical packet that is not the outside of the optical layers in that film. In some embodiments, a group of layers may be closer to a second optical packet than to an external side of the first optical packet. In this case the closeness of the group may be measured from the midpoint of the group of layers.

In some embodiments, an anti-wetout layer may be disposed proximate an external side of the multilayer optical film. The anti-wetout layer may be a particle-containing layer as described, for example, in U.S. Pat. No. 6,268,961.

One optical packet may be disposed on another optical packet. In some embodiments, the multilayer optical film may include a third optical packet, which may be disposed on the second optical packet. Disposed in this sense means optically coupled, and one packet need not be directly and fully in contact with the other in order to be considered disposed. For example, the packets may be adhered to one another with a pressure sensitive adhesive or an optically clear adhesive, or they may be separated by a skin layer or a protective boundary layer.

EXAMPLES

Measurement and Calculation of $R_{hemi}(\lambda)$ $R_{hemi}(\lambda)$ was measured using an apparatus described in US Pat. App. Pub. No. 2013/0215512 (Coggio, et al.). A commercial six inch integrating sphere manufactured by Labsphere (Labsphere, Inc., North Sutton, N.H.) and having a Spectralon® reflective coating, with three mutually orthogonal ports, was used to illuminate samples and to determine hemispherical reflectance spectrum, $R_{hemi}(\lambda)$. A stabilized light source illuminated the sphere through one port. A Photo Research® PR650 spectrophotometer (available from Photo Research Inc., Chatsworth, Calif.) was used to measure the sphere internal wall radiance through a second port. The sample was placed on the third port. Calibration of the integrating sphere wall radiance was done by using a known reflectance standard (Spectralon® Reference Target SRT-99-050 available from Labsphere, Inc., North Sutton, N.H.) placed on the third port, and sphere-wall radiance was measured with and without the calibration standard. $R_{hemi}(\lambda)$ was measured by placing samples on the third port; sample hemispheric reflectance $R_{hemi}(\lambda)$ was obtained by taking the ratio of the sphere wall radiance with and without the sample and employing a simple integrating sphere intensity-gain algorithm.

It is expected that the equilibrium intensity distribution within the integrating sphere approximates a Lambertian distribution, meaning the probability distribution of intensity with respect to incidence angle on the sample, will fall as cosine ($\theta$), where $\theta=0$ is normal to the sample.

FIG. 1 is a schematic perspective view of a reflective film. FIG. 1 illustrates a light ray 130 that is incident on a reflective film 110 at an angle of incidence $\theta$, thereby forming a plane of incidence 132. The reflective film 110 includes a first reflection axis 116 that is parallel to the x-axis, and a second reflection axis 114 that is parallel to the y-axis. The plane of incidence 132 of ray 130 is parallel to the first reflection axis 116. Ray 130 has a p-polarized component that is in the plane of incidence 132, and an s-polarized component that is orthogonal to the plane of incidence 132. The p-polarized light of ray 130 will be reflected by the reflective film with a reflectivity of $R_{pp-x}$ (the projection of the electric field of the p-polarized light of ray 130 onto the plane of reflective film 110 is parallel to the x-direction), while the s-polarized light of ray 130 is reflected by the reflective film with a reflectivity of $R_{ss-y}$ (the electric field of the s-polarized light of ray 130 is parallel to the y-direction).

Further, FIG. 1 illustrates ray 120 that is incident on the reflective film in a plane of incidence 122 that is parallel to the second reflection axis 114 of the film 110. Ray 120 has a p-polarized component that is in the plane of incidence 122, and an s-polarized component that is orthogonal to the plane of incidence 122. The p-polarized light of ray 120 will be reflected by the reflective film with a reflectivity of $R_{pp-y}$, while the s-polarized light of ray 120 is reflected by the reflective film with a reflectivity of $R_{ss-x}$. The amount of transmission and reflection of p- and s-polarized light, for any plane of incidence, will depend on the characteristics of reflective film, as is further described herein.

$R_{hemi}(\lambda)$ may be calculated from information on the layer thickness profiles of microlayers and the other layer elements of the optical film and from the refractive index values that are associated with each of the microlayers and other layers within the film. By using a 4×4 matrix-solving software application for the optical response of a multilayer film, both the reflection and transmission spectra can be calculated from the known layer thickness profile(s) and refractive index properties for the x-axis plane of incidence and for the y-axis plane of incidence and for each of p-polarized and s-polarized incident light. From this, $R_{hemi}(\lambda)$ may be calculated by use of the equations listed below:

$$R_{hemi}(\lambda) = \left(\frac{R^{x-axis}(\lambda) + R^{y-axis}(\lambda)}{2}\right) * (1/E_{norm})$$

where $$R^{x-axis}(\lambda) = \frac{1}{2}\int_0^{\pi/2} \{R_{pp-x}(\theta, \lambda) + R_{ss-x}(\theta, \lambda)\} * E(\theta)d\theta$$

$$R^{y-axis}(\lambda) = \frac{1}{2}\int_0^{\pi/2} \{R_{ss-y}(\theta, \lambda) + R_{pp-y}(\theta, \lambda)\} * E(\theta)d\theta$$

and $$E_{norm} = \int_0^{\pi/2} E(\theta)d\theta$$

where $E(\theta)$ is the intensity distribution.

Figure 2:
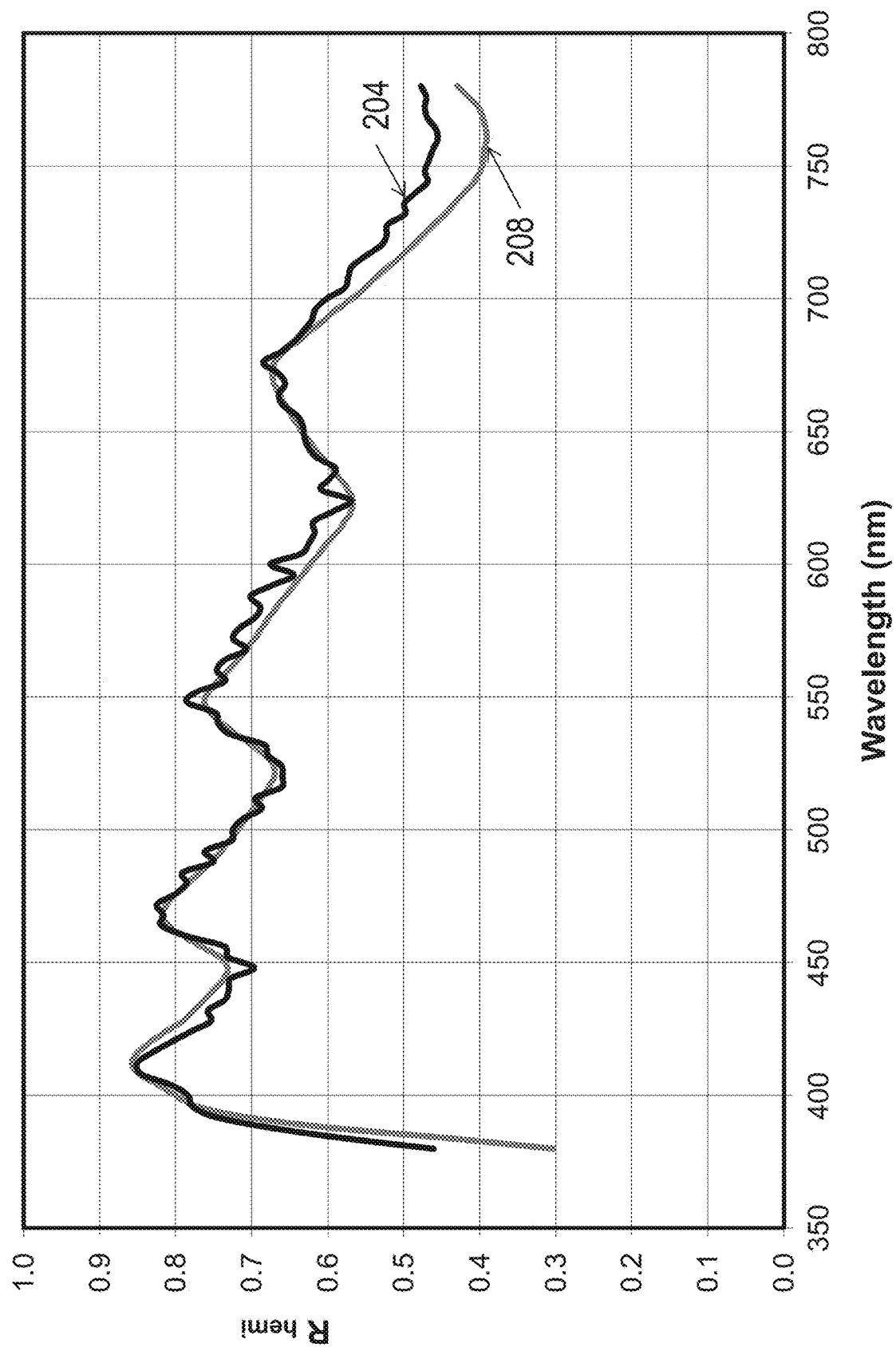
FIG. 2 is a graph showing calculated versus measured hemispheric reflectivity for a multilayer polymeric reflective film.

A multilayer polymer reflector film configured with an array of higher order harmonic visible reflection bands as generally described in U.S. Pat. No. 6,531,230 (Weber, et al.) was obtained. $R_{hemi}(\lambda)$ for the multilayer polymer reflector film was measured using the Labsphere integrating sphere as described above and the resulting spectra 208 is shown in FIG. 2. The transmission spectrum for this multilayer polymer reflector film was measured with a PerkinElmer L1050 spectrophotometer (PerkinElmer Inc., Waltham, Pa.) and $R_{hemi}$ was calculated using the equations listed above. In this calculation, and for all further $R_{hemi}(\lambda)$ calculations, $E(\theta)$ was taken as a Lambertian intensity distribution, with a cosine($\theta$) dependence. FIG. 2 demonstrates that the calculated $R_{hemi}(\lambda)$ spectrum 204 is in good agreement with the measured $R_{hemi}(\lambda)$ spectrum 208 for the multilayer polymer reflector film.

Comparative Example C1

Enhanced Specular Reflector (ESR, available from 3M Company, St. Paul, Minn.) is a broadband mirror film designed to act as a back reflector for an LCD backlight. ESR contains two optical packets, herein denoted Packet 1 and Packet 2, each consisting of 162 optical repeat units of quarterwave Polyethelyenenaphthalate (PEN) and polymethyl methacrylate (PMMA). Each packet is separated at the interior film region by a 4.6 μm thick monolithic PEN layer and the exterior of the film structure is bounded on each side by a 4.6 μm thick monolithic PEN layer.

Figure 3:
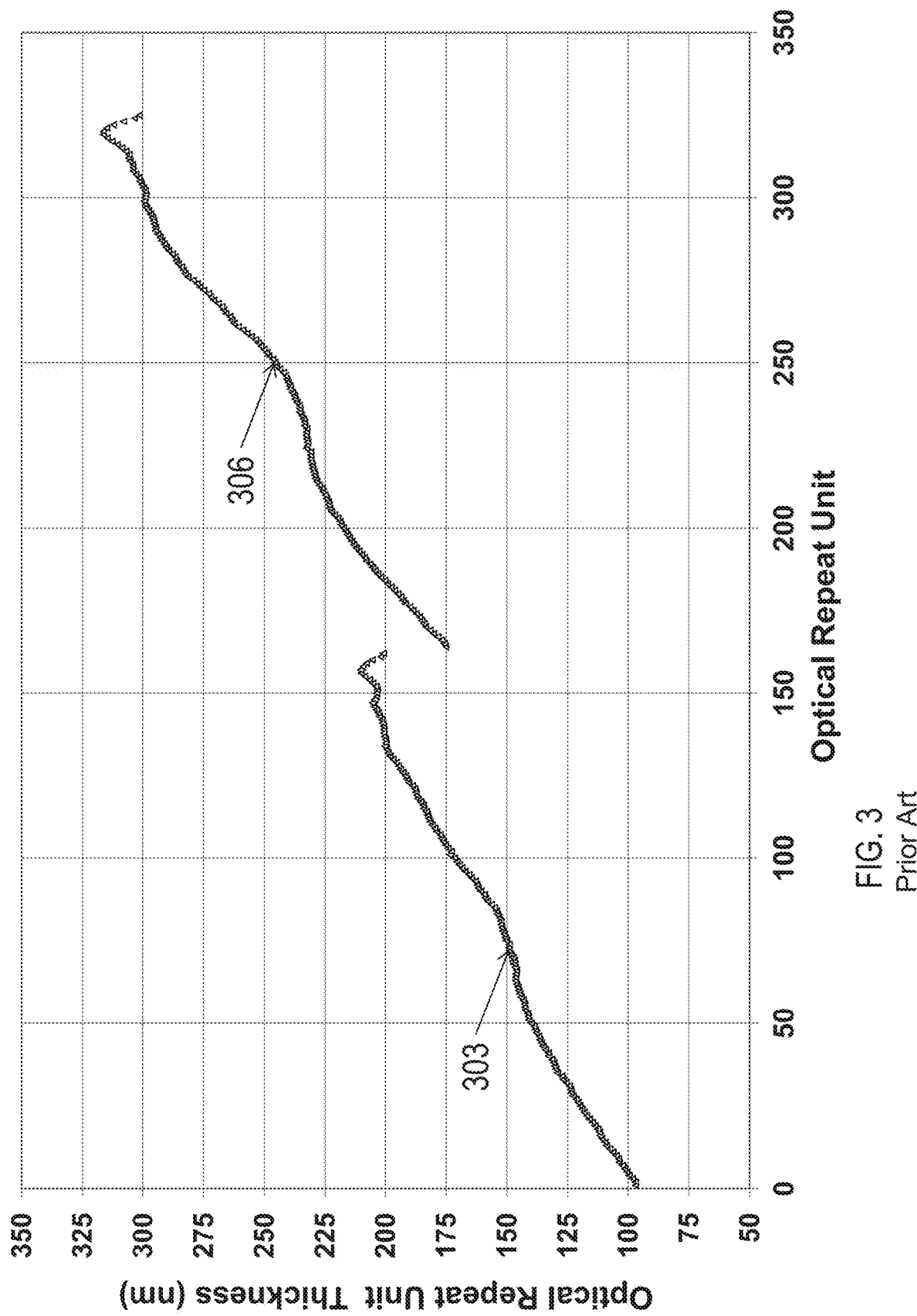
FIG. 3 is a graph showing the layer profile of the multilayer film of Comparative Example C1.

ESR film was obtained and Atomic Force Microscopy (AFM) was employed to determine the layer thickness profile for each of the two packets in the ESR film. The resulting layer thickness profile 303 for Packet 1 and layer thickness profile 306 for Packet 2 are shown in FIG. 3.

A 4×4 Matrix-solving software application for the optical response of a multilayer film was used to compute reflection spectra for the ESR film. The real ($n_x$, $n_y$, $n_z$) and imaginary ($k_x$, $k_y$, $k_z$) parts of the wavelength dependent refractive indices for PEN and PMMA that were used in the simulation are given in Table 1. In the calculation, the refractive index values were taken to vary smoothly between and beyond the values of Table 1.

TABLE 1

| | | Wavelength | | |
|---|---|---|---|---|
| | | 450 nm | 550 nm | 650 nm |
| PEN | $n_x$ | 1.832 | 1.778 | 1.754 |
| | $n_y$ | 1.817 | 1.770 | 1.747 |
| | $n_z$ | 1.515 | 1.498 | 1.491 |
| | $k_x$ | $6.0 \times 10^{-6}$ | $5.5 \times 10^{-6}$ | $3.9 \times 10^{-6}$ |
| | $k_y$ | $6.0 \times 10^{-6}$ | $5.5 \times 10^{-6}$ | $3.9 \times 10^{-6}$ |
| | $k_z$ | $6.0 \times 10^{-6}$ | $5.5 \times 10^{-6}$ | $3.9 \times 10^{-6}$ |
| PMMA | $n_x$ | 1.506 | 1.497 | 1.493 |
| | $n_y$ | 1.506 | 1.497 | 1.493 |
| | $n_z$ | 1.506 | 1.497 | 1.493 |
| | $k_x$ | 0 | 0 | 0 |
| | $k_y$ | 0 | 0 | 0 |
| | $k_z$ | 0 | 0 | 0 |

The normal angle reflection spectra were calculated for light incident both from the Packet 1 side (baseline configuration) and from the Packet 2 side ("reversed" configuration). The normal angle reflection spectra were also measured using a PerkinElmer L1050 spectrophotometer (PerkinElmer Inc., Waltham, Pa.). There was good agreement between the measured and the modeled spectra which indicated that the computational technique captured the relevant physics of reflection from an ESR film, including the effects of absorptive losses on the detailed reflection spectra.

The $R_{hemi}(\lambda)$ spectrum was calculated by determining the reflectivity at a complete range of incident angles and calculating a reflection coefficient for a probability distribution of incident angles appropriate for a back reflector in an LCD recycling backlight. These $R_{hemi}(\lambda)$ spectra were calculated for light incident both from the Packet 1 side (baseline configuration) and from the Packet 2 side ("reversed" configuration).

Figure 4:
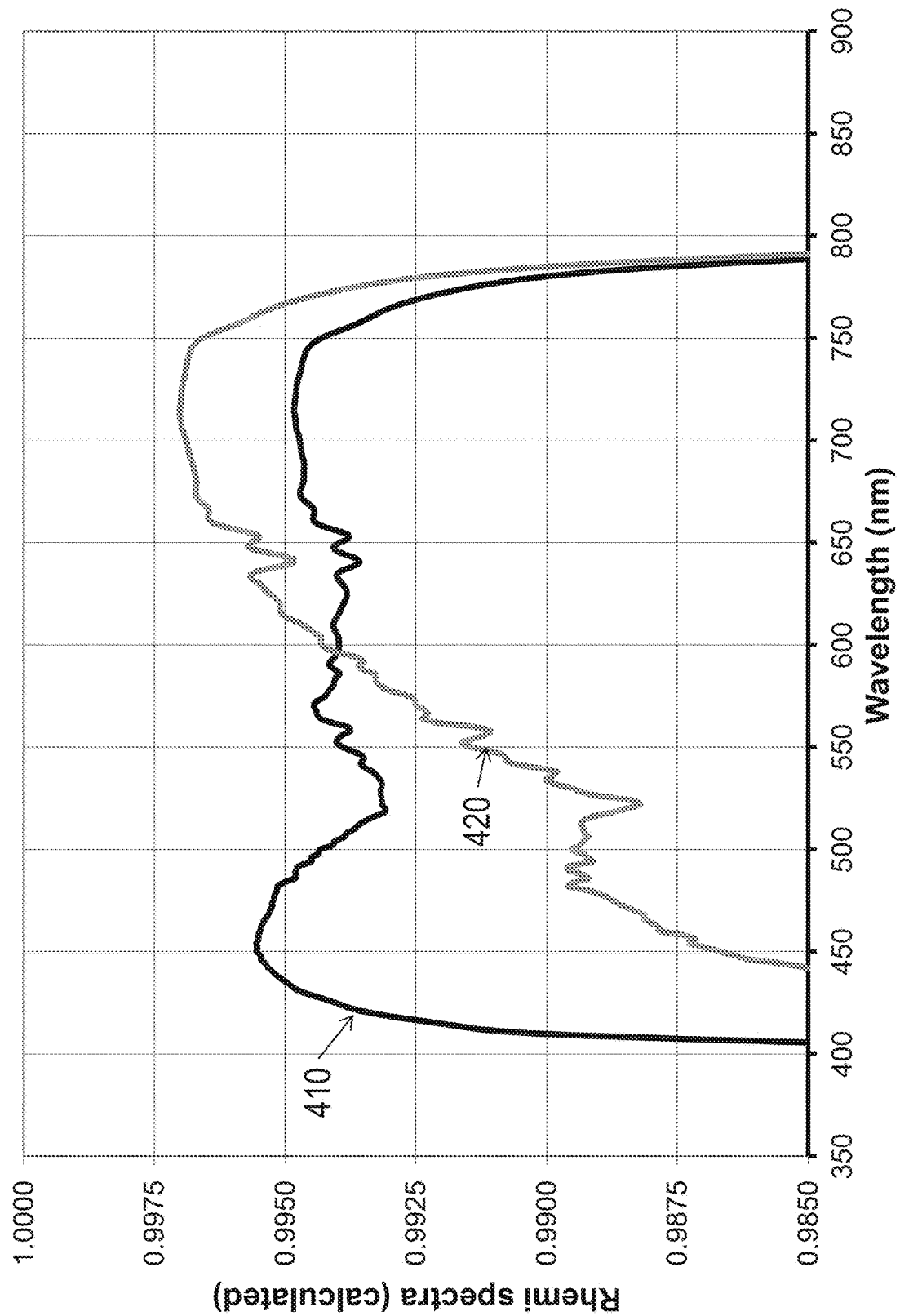
FIG. 4 is a graph showing hemispheric reflectivity spectra of the multilayer film of Comparative Example C1.

The calculated $R_{hemi}(\lambda)$ spectra 410 for light incident from the Packet 1 side and the calculated $R_{hemi}(\lambda)$ spectra 420 for light incident from the Packet 2 side of the ESR film of Comparative Example C1 are shown in FIG. 4. A comparison of the $R_{hemi}(\lambda)$ spectra in FIG. 4 shows that the hemispheric reflectivity is significantly greater across the visible wavelength band (420 nm to 650 nm) for light incident from the Packet 1 side (baseline configuration), where the thinnest layers (blue layers) are on the side of film from which the light is incident.

This result of Comparative Example C1 may have led to the belief that, in order to maximize reflectivity, layers that are resonant at blue light—in other words, layers that are tuned to have an optical thickness a quarter of blue wavelengths (with an optical repeat unit of 2 microlayers having an optical thickness of half the wavelength of blue light and thereby reflecting blue light through constructive interference)—should be near an external optical surface of the multilayer optical film, more particularly, an external optical surface on which the light in a backlight is incident.

Example 1

Figure 5:
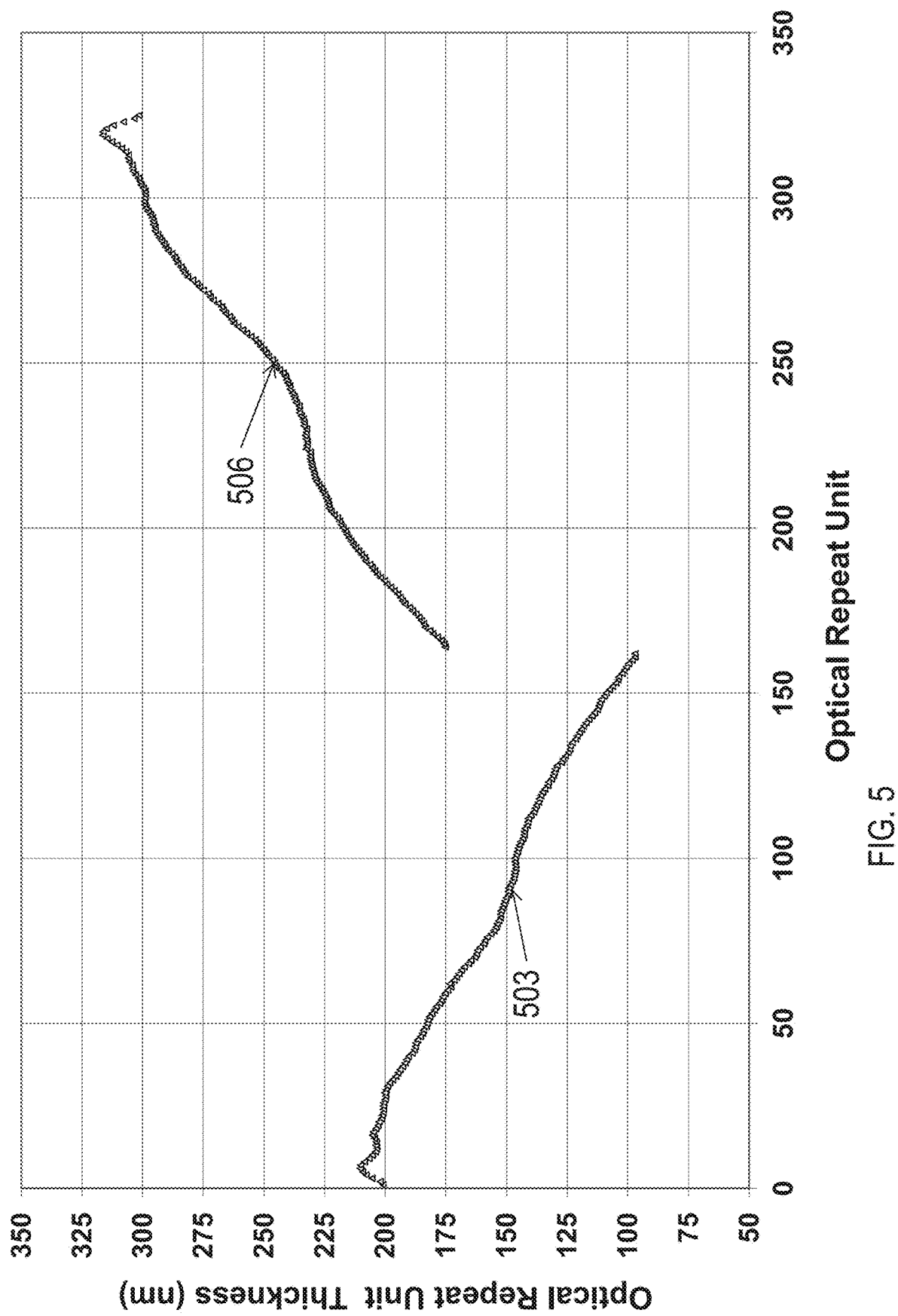
FIG. 5 is a graph showing the layer profile of the multilayer film of Example 1.

A calculation of the $R_{hemi}(\lambda)$ spectra was performed for a film having Packet 1 and Packet 2 of ESR arranged such that the orientation of Packet 1 was flipped compared to ESR and the "red layers" of Packet 1 were configured to reside nearest to the exterior of the film from which the light was incident. The resulting layer thickness profile 503 for Packet 1 and the layer thickness profile 506 for Packet 2 are shown in FIG. 5.

Figure 6:
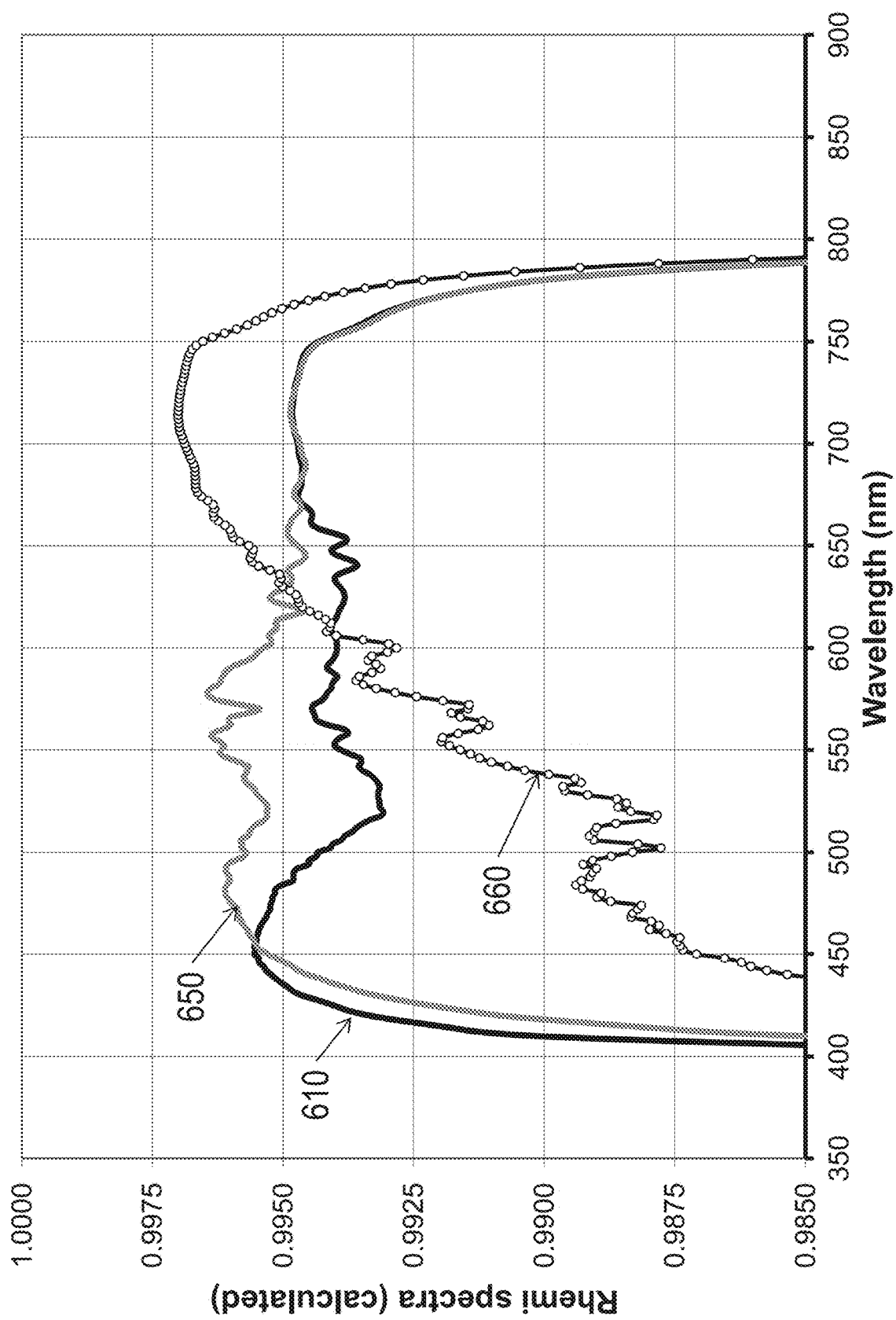
FIG. 6 is a graph showing hemispheric reflectivity spectra of the multilayer film of Example 1.

FIG. 6 shows the calculated $R_{hemi}(\lambda)$ spectra 650 for the "Packet 1 flipped" configuration as compared with the calculated $R_{hemi}(\lambda)$ spectra 660 for the "Packet 1 flipped—reversed" configuration where the light is incident from the opposite side of the film. Each is compared with the calculated $R_{hemi}(\lambda)$ spectra 610 for the baseline configuration of Comparative Example C1. The "Packet 1 flipped" configuration achieved higher hemispheric reflectivity than the baseline configuration of Comparative Example C1.

Example 2

Figure 7:
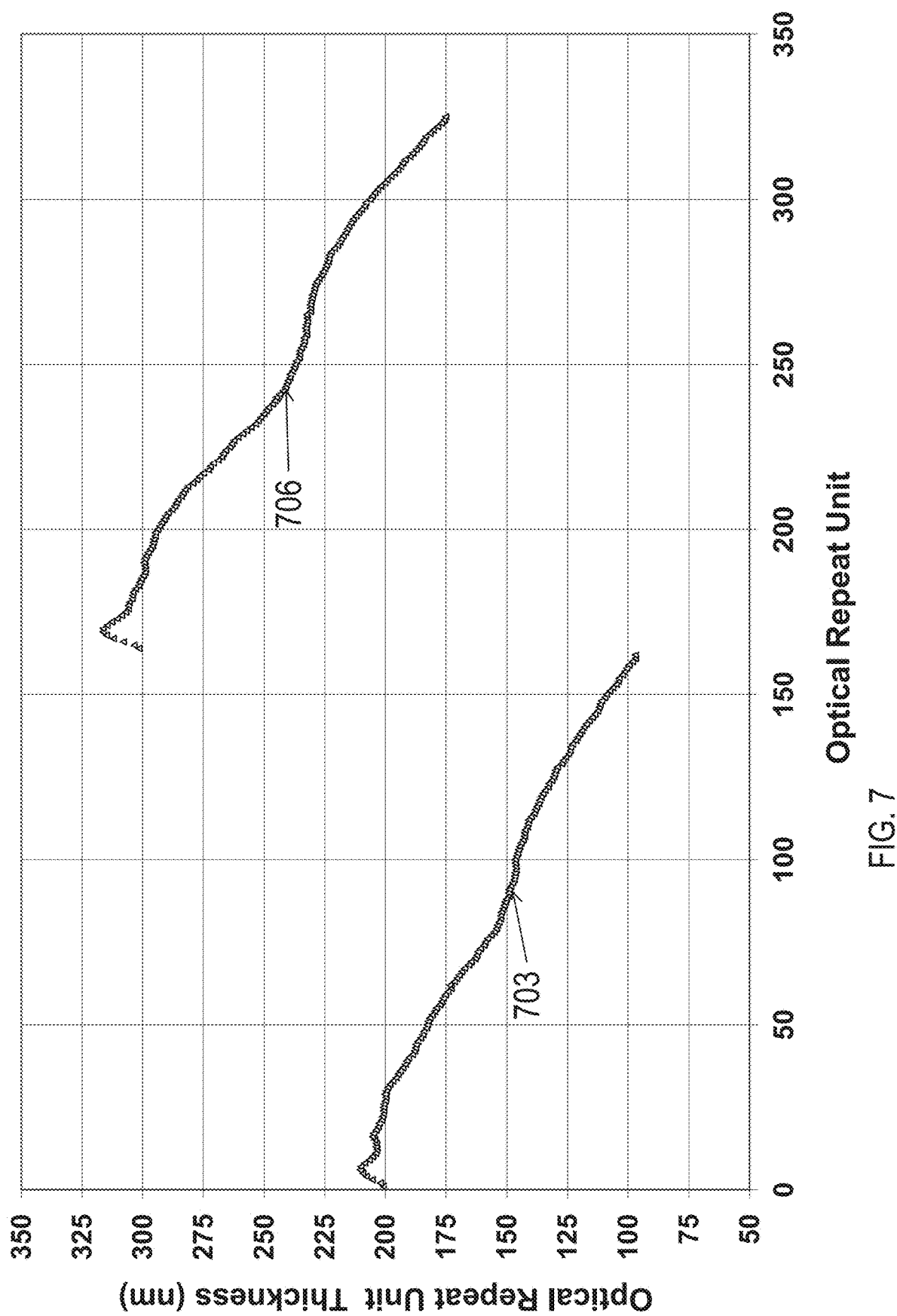
FIG. 7 is a graph showing the layer profile of the multilayer film of Example 2.

A calculation of the $R_{hemi}(\lambda)$ was performed for a film having Packet 1 and Packet 2 of ESR arranged such that the orientation of Packet 1 and of Packet 2 was flipped and the "red layers" of Packet 1 were configured to reside nearest to the exterior of the film from which the light was incident. The resulting layer thickness profile 703 for Packet 1 and the layer thickness profile 706 for Packet 2 are shown in FIG. 7.

Figure 8:
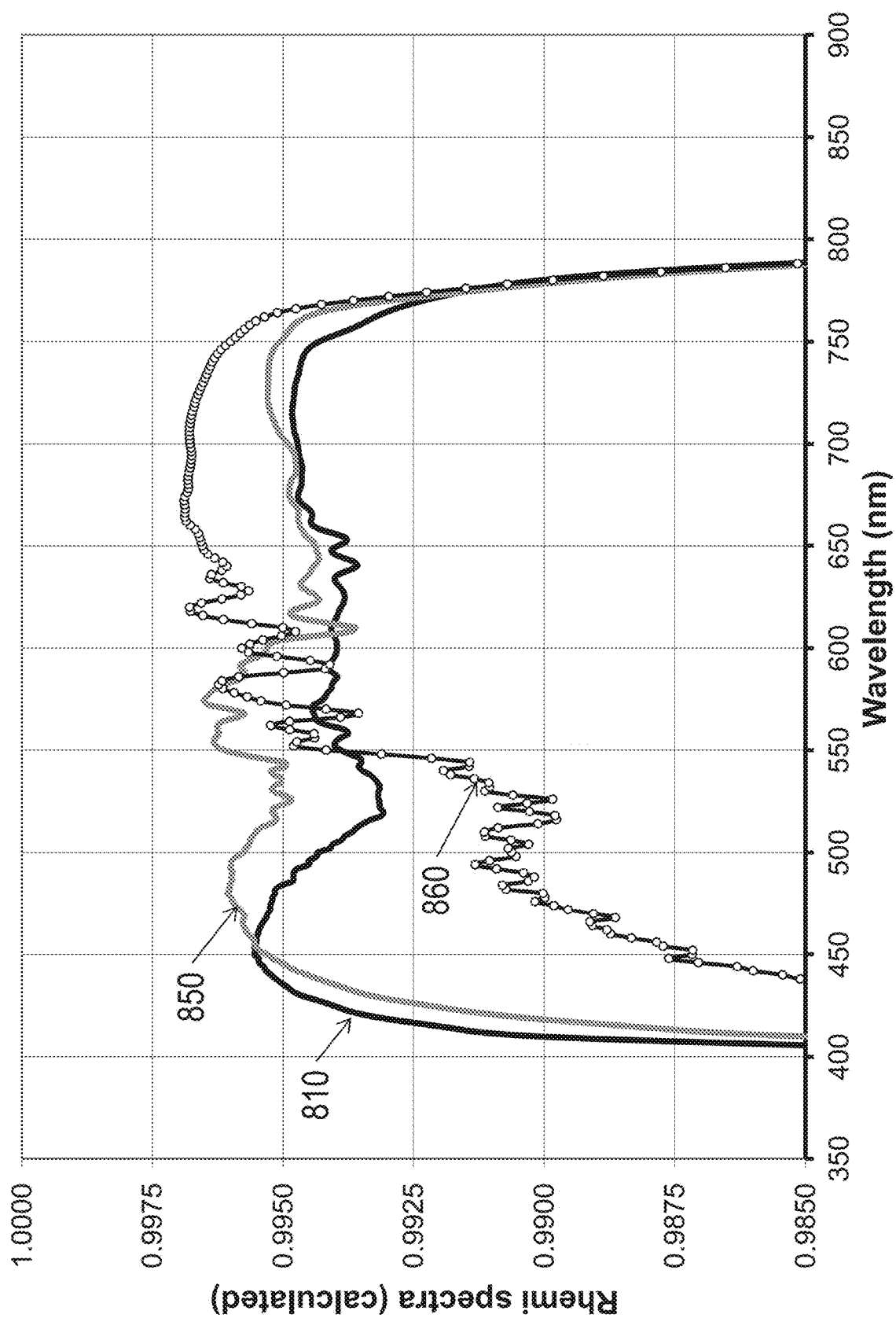
FIG. 8 is a graph showing hemispheric reflectivity spectra of the multilayer film of Example 2.

FIG. 8 shows the calculated $R_{hemi}(\lambda)$ spectra 850 for the "Packet 1 and Packet 2 flipped" configuration as compared with the calculated $R_{hemi}(\lambda)$ spectra 860 for the "Packet 1 and Packet 2 flipped—reversed" configuration where the light is incident from the opposite side of the film. Each is compared with the calculated $R_{hemi}(\lambda)$ spectra 810 for the baseline configuration of Comparative Example C1. The "Packet land Packet 2 flipped" configuration achieved higher hemispheric reflectivity than the baseline configuration of Comparative Example C1.

Comparative Example C2

Figure 9:
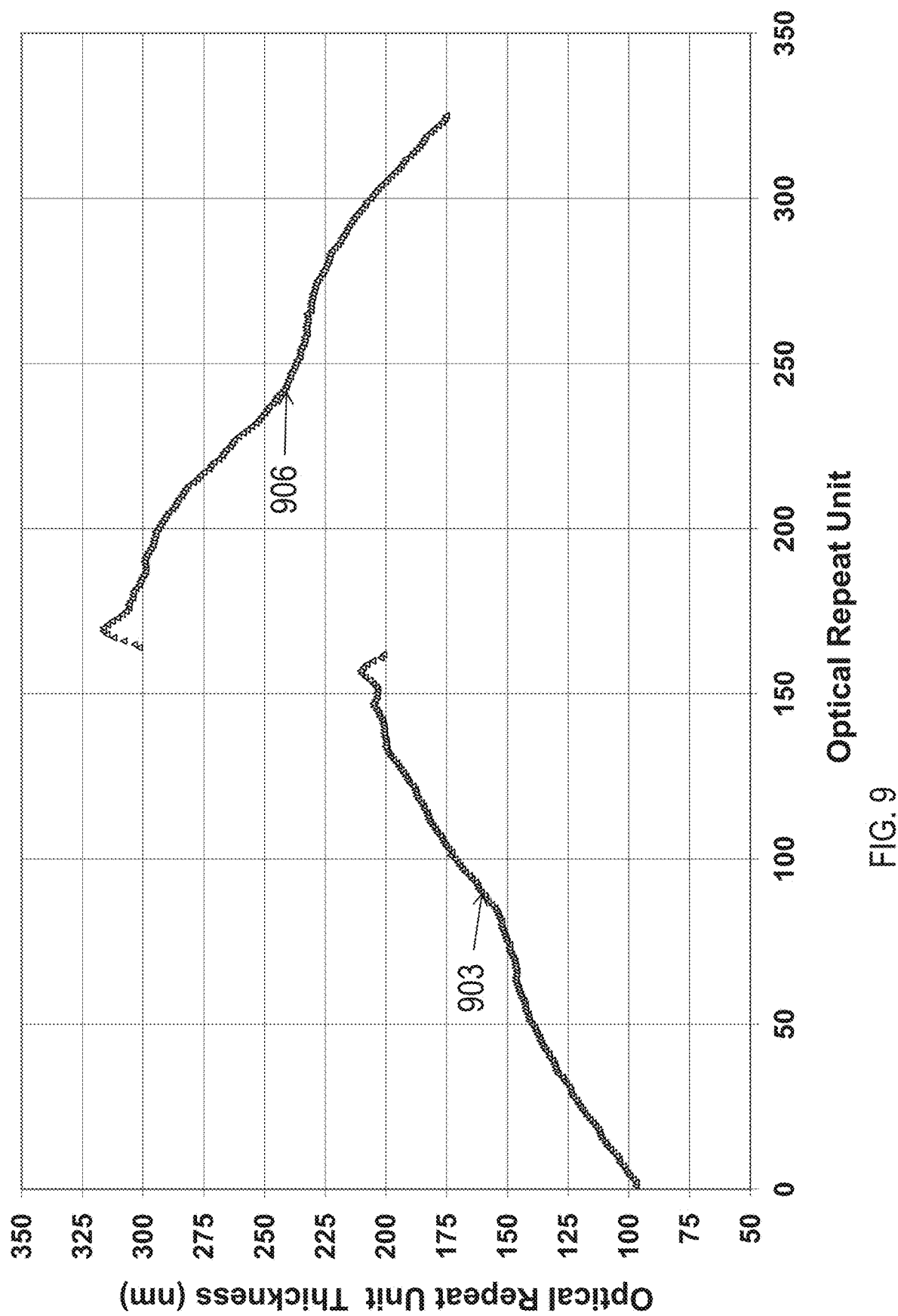
FIG. 9 is a graph showing the layer profile of the multilayer film of Comparative Example C2.

A calculation of the $R_{hemi}(\lambda)$ spectra for the ESR film of Comparative Example C1 was made in which the orientation of Packet 2 was flipped and the "blue layers" of Packet 1 were configured to reside nearest to the exterior of the film from which the light is incident. The resulting layer thickness profile 903 for Packet 1 and the layer thickness profile 906 for Packet 2 are shown in FIG. 9.

Figure 10:
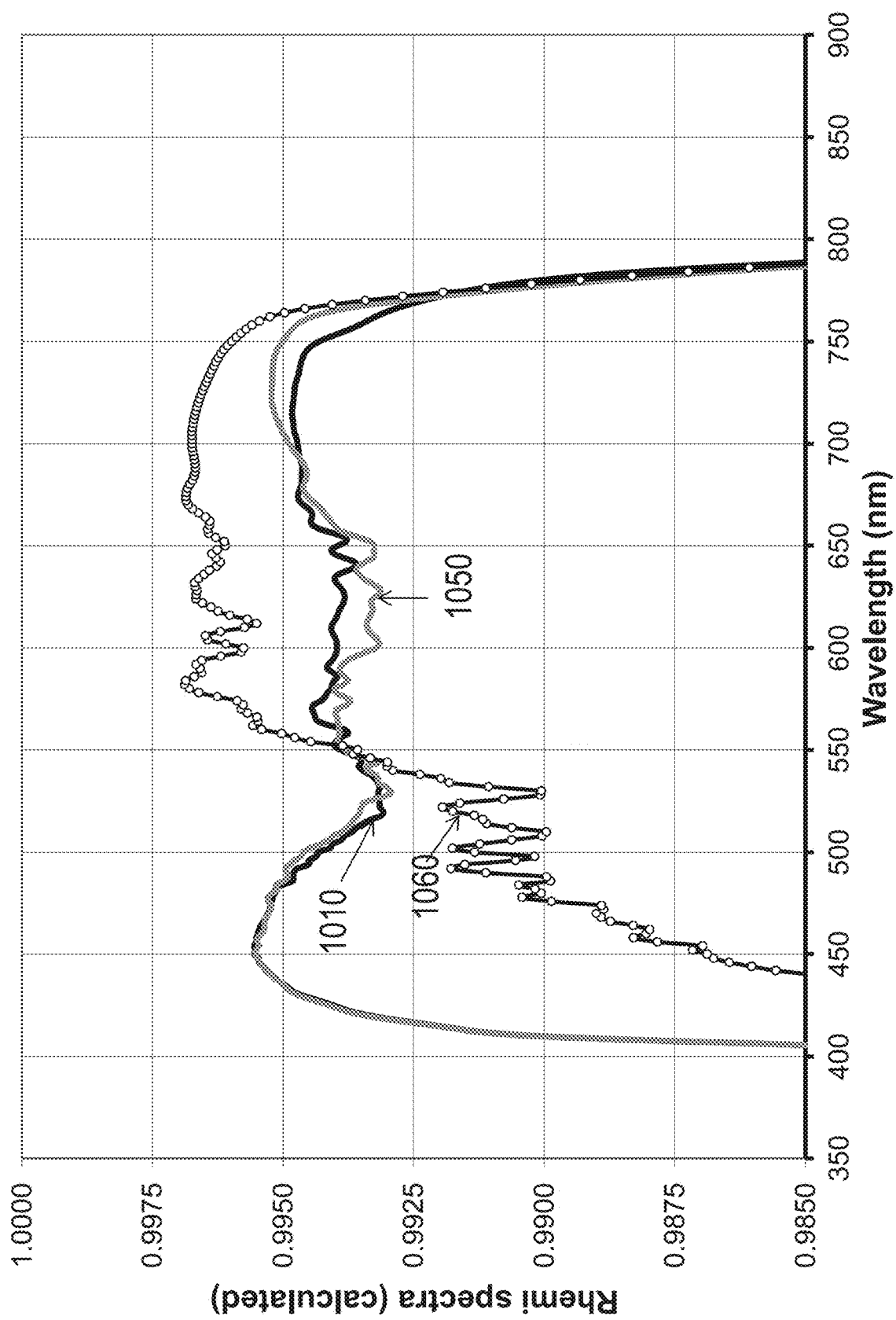
FIG. 10 is a graph showing the hemispheric reflectivity spectra of the multilayer film of Comparative Example C2.

FIG. 10 shows the calculated $R_{hemi}(\lambda)$ spectra 1050 for the "Packet 2 flipped" configuration as compared with the calculated $R_{hemi}(\lambda)$ spectra 1060 for the "Packet 2 flipped—reversed" configuration where the light is incident from the opposite side of the film. Each is compared with the calculated $R_{hemi}(\lambda)$ spectra 1010 baseline configuration of Comparative Example C1. The "Packet 2 flipped" configuration gave hemispheric reflectivity that was comparable to that of the baseline configuration of Comparative Example C1.

For each of the configurations of Comparative Example C1 and C2 and Examples 1 and 2, the photopically weighted average of the $R_{hemi}(\lambda)$ spectra was determined using the CIE 1931 photopic response function and is reported in Table 2 along with the Loss which is given as 100 percent minus $R_{hemi}$. The Loss for ESR was reduced from 0.61% to 0.43% for the case where the first packet was flipped so that the thicker layers faced the light source.

TABLE 2

| Configuration | $R_{hemi}$ (%, photopically averaged) | Loss = 100% − $R_{hemi}$ |
| --- | --- | --- |
| ESR | 99.39 | 0.61 |
| ESR - Reversed | 99.17 | 0.83 |
| Packet 1 Flipped | 99.57 | 0.43 |
| Packet 1 Flipped - Reversed | 99.14 | 0.86 |
| Packet 2 Flipped | 99.37 | 0.63 |
| Packet 2 Flipped - Reversed | 99.40 | 0.60 |
| Packet 1 and 2 Flipped | 99.55 | 0.44 |
| Packet 1 and 2 Flipped - Reversed | 99.35 | 0.65 |

The following are exemplary embodiments according to the present disclosure:

Item 1. A polymeric multilayer optical film, comprising:
a first optical packet including a group of optical layers that reflects blue light; and
a second optical packet disposed on the first optical packet;
wherein the first optical packet is configured such that the group of optical layers that reflects blue light is nearer to the second optical packet than to outer optical layers of the polymeric multilayer optical film;
and wherein the polymeric multilayer optical film reflects more than about 95% of light from 400 nm to 700 nm at normal incidence.

Item 2. The polymeric multilayer optical film of item 1, wherein the group of layers that reflects blue light includes the thinnest optical layer of the first optical packet.

Item 3. A polymeric multilayer optical film, comprising: a first optical packet having a substantially linear layer profile with a negative slope, wherein a group of layers proximate an external side of the first optical packet reflects red light; and
a second optical packet disposed on the first optical packet;
wherein the polymeric multilayer optical film reflects more than about 95% of light from 400 nm to 700 nm at normal incidence.

Item 4. The polymeric multilayer optical film of claim 3, wherein the group of layers that reflects red light includes the thickest optical layer of the first optical packet.

Item 5. The polymeric multilayer optical film of item 3, wherein the group of layers that reflects red light are adjacent to the external side of the first optical packet.

Item 6. A polymeric multilayer optical film, comprising:
a first optical packet having a first group of layers proximate a first side of the first optical packet reflecting substantially red light and a second group of layers proximate a second side of the first optical packet reflecting substantially blue light; and
a second optical packet disposed on the first optical packet;
wherein the first optical packet is oriented such that the second group of layers is disposed between the first group of layers and the second optical packet; and
wherein the polymeric multilayer optical film reflects more than about 95% of light from 400 nm to 700 nm at normal incidence.

Item 7. The polymeric multilayer optical film of item 6, wherein the first group of the first optical packet is adjacent the first side of the first optical packet.

Item 8. The polymeric multilayer optical film of either item 6 or 7, wherein the second group of the first optical packet is adjacent the second side of the first optical packet.

Item 9. A polymeric multilayer optical film, comprising:
a first optical packet and a second optical packet disposed on the first optical packet;
wherein the thinnest optical layer of the polymeric multilayer optical film is substantially in the middle of the polymeric multilayer optical film; and
wherein the polymeric multilayer optical film reflects more than about 95% of light from 400 nm to 700 nm at normal incidence.

Item 10. The polymeric multilayer optical film of any of items 1-9, wherein the polymeric multilayer optical film is thinner than 100 µm.

Item 11. The polymeric multilayer optical film of any of items 1-9, wherein the polymeric multilayer optical film is thinner than 85 µm.

Item 12. The polymeric multilayer optical film of any of items 1-9, wherein the polymeric multilayer optical film is thinner than 65 µm.

Item 13. The polymeric multilayer optical film of any of items 1-9, further comprising a third optical packet disposed on the second optical packet.

Item 14. The polymeric multilayer optical film of item 13, wherein the polymeric multilayer optical film is thinner than 165 µm.

Item 15. The polymeric multilayer optical film as in any of the preceding items, further comprising an anti-wetout layer.

Item 16. The polymeric multilayer optical film as in any of the preceding items, wherein the polymeric multilayer optical film reflects more than 99% of light from 400 nm to 700 nm at normal incidence.

Item 17. A liquid crystal display comprising the polymeric multilayer optical film as in any of the preceding items.

Item 18. A hollow recycling cavity comprising the polymeric multilayer optical film as in any of items 1-15.

Item 19. A backlight comprising the polymeric multilayer optical film as in any of items 1-15.

Item 20. A roll of the polymeric multilayer optical film as in any of items 1-15.

All U.S. patents and patent applications cited in the present application are incorporated herein by reference as if fully set forth. The present invention should not be considered limited to the particular examples and embodiments described above, as such embodiments are described in detail in order to facilitate explanation of various aspects of the invention. Rather, the present invention should be understood to cover all aspects of the invention, including various modifications, equivalent processes, and alternative devices falling within the scope of the invention as defined by the appended claims and their equivalents.

What is claimed is:

1. A polymeric multilayer optical film, comprising stacked first and second optical packets, each packet having an optical reflectance greater than about 95% in a wavelength range extending from about 420 nm to about 650 nm, each packet comprising a plurality of microlayers forming a plurality of sequentially arranged optical repeat units, each optical repeat unit having a thickness between 50 nm and 350 nm, each packet comprising thinner and thicker microlayers, the thinner microlayers in each packet closer to the other packet and the thicker microlayers in each packet farther from the other packet, thinnest optical repeat units in the first and second packets having different thicknesses.

2. The polymeric multilayer optical film of claim 1, wherein each packet has an optical reflectance greater than about 98% in the wavelength range extending from about 420 nm to about 650 nm.

3. The polymeric multilayer optical film of claim 1, wherein each packet has more than 100 optical repeat units.

4. The polymeric multilayer optical film of claim 1, wherein for each packet, a thickest microlayer is an internal microlayer of the packet.

5. A liquid crystal display comprising the polymeric multilayer optical film of claim 1.

6. A roll of the polymeric multilayer optical film of claim 1.

* * * * *